Nov. 8, 1938.　　　G. A. LYON　　　2,135,758
WHEEL CONSTRUCTION
Filed July 16, 1936　　　2 Sheets-Sheet 1
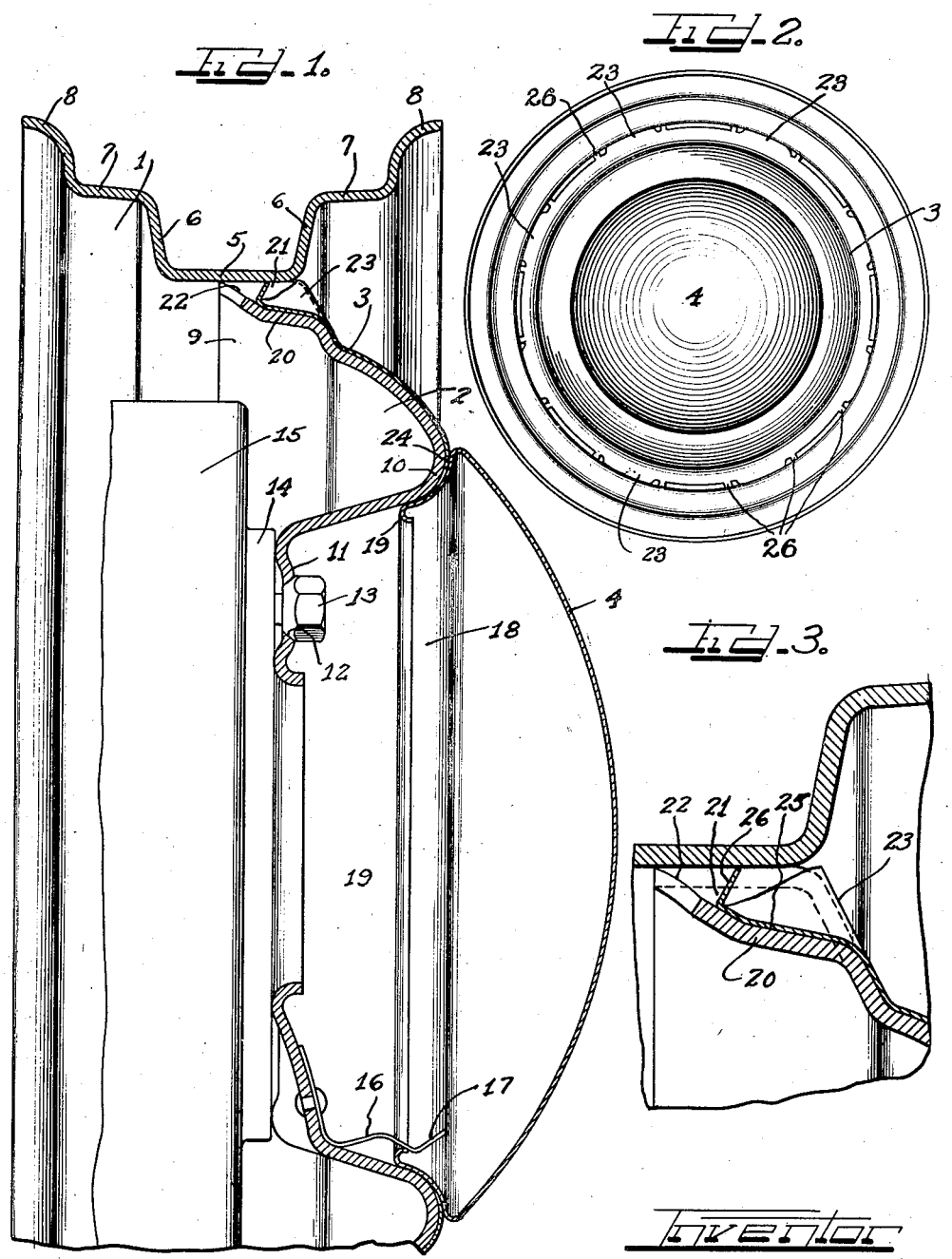
Inventor
GEORGE ALBERT LYON.

Nov. 8, 1938.  G. A. LYON  2,135,758
WHEEL CONSTRUCTION
Filed July 16, 1936   2 Sheets-Sheet 2
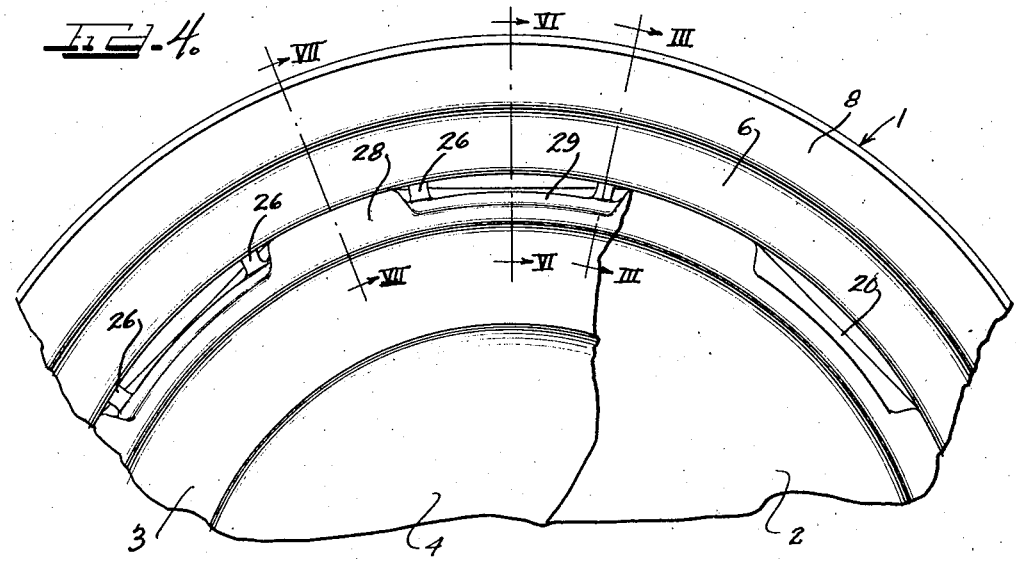
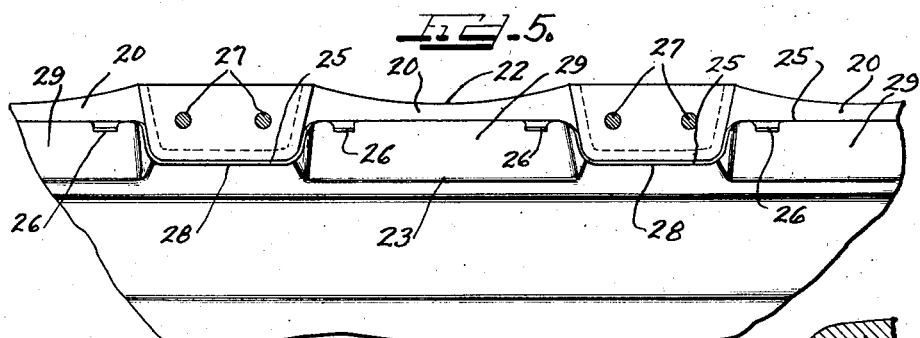
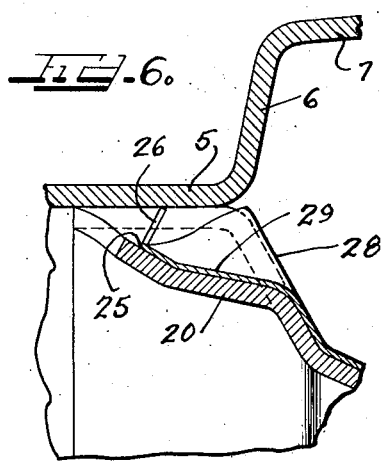
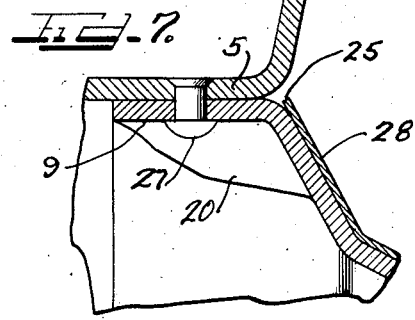
Inventor
GEORGE ALBERT LYON.
by
Attys.

Patented Nov. 8, 1938

2,135,758

UNITED STATES PATENT OFFICE 2,135,758

WHEEL CONSTRUCTION

George Albert Lyon, Allenhurst, N. J.

Application July 16, 1936, Serial No. 90,903

8 Claims. (Cl. 301—37)

REISSUED

DEC 1 2 1939

This invention relates to improvements in wheel and wheel disk constructions and more particularly to a wheel assembly of the type having an annular series of air circulation apertures.

It is an object of this invention to provide a new and novel form of wheel assembly which is economical to manufacture and rugged and reliable in use.

It is a further object of this invention to provide a novel form of ornamental wheel disk which is adapted to be disposed over the outer surface of the body part of a wheel.

It is also an object of this invention to provide an improved and novel means for securing an ornamental member or wheel disk to a wheel.

One form of vehicle wheel which is being manufactured at the present time includes a body part rim flange which is depressed radially inwardly at a plurality of points to form a series of air circulation passageways through the wheel. It is an object of this invention to provide a novel ornamental member which lies in intimate contact with the outer surface of the wheel body part and a substantial part of the depressed portion of the body part rim flange, and which is secured in place by a plurality of integral tangs which make a biting engagement with the base flange of the rim within the aforesaid air passageways.

The novel features which I believe to be characteristic of my invention are set forth with particularity in the appended claims. My invention, however, together with further objects and advantages thereof, may best be understood by reference to the following description taken in connection with the accompanying drawings, in which:

Figure 1 is an elevational view partly in cross section of one embodiment of my invention;

Figure 2 is a side elevational view of the vehicle wheel illustrated in Figure 1;

Figure 3 is an enlarged fragmentary sectional view of a portion of the structure in the upper right hand part of Figure 1, taken along the line III—III of Figure 4;

Figure 4 is an enlarged fragmentary elevational view partly in cross section;

Figure 5 is an enlarged fragmentary cross-sectional plan view looking down on the wheel disk at the junction point of the body part of the wheel with the rim of the wheel;

Figure 6 is an enlarged fragmentary sectional view taken along the line VI—VI of Figure 4; and Figure 7 is an enlarged fragmentary sectional view taken along the line VII—VII of Figure 4.

Referring now to Figure 1 the wheel assembly illustrated therein comprises, in general, a rim 1, a wheel body part 2, an ornamental member 3, and an ornamental hub cap 4. Rim 1 is illustrated as being of the usual drop center rim type and includes a base flange 5, opposite side flanges 6, opposite intermediate flanges 7, and opposite edge portions 8. It will of course be understood that the wheel in its operative form includes a pneumatic tire (not shown for purposes of clarity) which is mounted on rim 1 in the usual manner. Body part 2 has at its outer periphery an axial inwardly extending flange 9 which is adapted to be secured to base flange 5 of rim 1 in any suitable manner, such as by rivets (not shown). Body part 2 turns abruptly axially inwardly near the center of the wheel to form a shoulder 10 and then abruptly radially inwardly to form a circular holding flange 11. Circular holding flange 11 is provided with an annular series of apertures 12 through which a corresponding number of bolts 13 are adapted to be inserted to secure body part 2 to a vehicle axle part 14, the latter being attached in the usual manner to a vehicle brake drum 15.

Secured to flange 11 are five hub cap retaining spring elements 16. Each spring element includes an outwardly extending leg which terminates in a hook-like end 17, which is resilient, and which is adapted to have the hub cap 4 snapped into engagement therewith for securing the hub cap in place. In order to avoid unnecessary complication of the drawings only one spring element 16 has been illustrated, but it is to be understood that a number of such spring elements are secured to holding flange 11, preferably at least five or six.

Hub cap 4 comprises a hollow shell including an inwardly turned skirt 18, shaped to engage against the shoulder 10 of wheel body part 2. Skirt 18 terminates in a turned edge 19 over which the hook-like ends 17 of the spring elements are adapted to slide as the hub cap is forced axially into retaining engagement with the spring elements.

Upon close inspection of the various figures of the drawings, it will be observed that axial flange 9 of wheel body part 2 is depressed radially inwardly at a plurality of points 20. The depressed portions 20 of flange 9 in conjunction with base flange 5 of rim 1 form a series of air circulation passageways 21 through the wheel. It is to be noted that the depressed portions 20 are continuous with the main portion of flange 9 and are not broken away from the latter to form a plurality of inwardly extending teeth. Thus each air circulation passageway 21 is open only at its axial ends 22 and 23 respectively.

Referring again to Figures 4 and 5 it will be seen that ornamental member 3 is formed to lie in intimate contact with the outer surface of the wheel body part 2 and a substantial part of the depressed portions 20 of flange 9. Inner marginal edge 24 of ornamental member 3 extends partly over shoulder 10 of body part 2, and is adapted to lie between shoulder 10 and hub cap 4. Thus when hub cap 4 is snapped into locking engagement with spring elements 16 the inner marginal edge 24 of ornamental member 3 is held firmly against shoulder 10 of body part 2.

As may be seen best in Figure 5 of the drawings the outer marginal edge 25 of ornamental member 3 follows the varying configuration of the wheel body part 2 in proximity to the latter's junction point with rim 1. Thus ornamental member 3 not only lies in intimate contact with the outer surface of wheel body part 2 as at 28 but it also lies in intimate contact with a substantial portion of the depressed portions 20 of flange 9 as at 29.

The outer marginal edge 25 of ornamental member 3 is firmly secured to the wheel assembly by providing a plurality of integral tangs 26 at the outer peripheral edge of ornamental member 3 which extend radially and axially outwardly into biting engagement with base flange 5 of rim 1. Any tendency for ornamental member 3 to be dislodged from the wheel assembly, only causes the tangs 26 to bite deeper into base flange 5 and thus form a still firmer locking engagement with base flange 5.

One or more tangs 26 may be provided for each depressed portion 20, but preferably two are provided, one adjacent each side wall of the passageway 21. The width of each tang 26 should be relatively small compared to the circumferential dimension of passageway 21 in order that the tangs will not interfere with the free circulation of air through the passageways 21. This is an important commercial design feature since it is necessary to maintain the brake drum 15 relatively cool to prevent burning out the brake lining (not shown) and other harmful results.

It will be noted from the above description that that portion of air passageway 21 which is ordinarily visible to the eye is entirely covered by ornamental member 3. This greatly enhances the general appearance of the vehicle wheel without interfering with structural details which are inherent in sound engineering practice. It will also be observed that the ornamental member described is extremely economical to manufacture and may readily and quickly be assembled on a vehicle wheel of the type described.

While I have shown a particular embodiment of my invention, it will of course be understood that I do not wish to be limited thereto since many modifications may be made, and I therefore contemplate by the appended claims to cover all such modifications as fall within the true spirit and scope of my invention.

I claim as my invention:

1. In a wheel assembly, the combination comprising a drop center rim having a base flange, a wheel body part having an axial inwardly extending flange secured at a plurality of circumferentially spaced points to said base flange, said axial flange being depressed radially inwardly between said spaced points to define a series of chambers which are open at their axial ends only, an ornamental member disposed in intimate contact over the outer surface of said body part and over a substantial portion of the depressed portions of said axial flange, and a plurality of tangs integral with the outer marginal edge of said member which extend into biting engagement with a wall of said chambers.

2. In a wheel assembly, the combination comprising a drop center rim having a base flange, a wheel body part having an axial inwardly extending flange secured at a plurality of circumferentially spaced points to said base flange, said axial flange being depressed radially inwardly between said spaced points to define a series of chambers which are open at their axial ends only, an ornamental member disposed in intimate contact over the outer surface of said body part and over a substantial portion of the depressed portions of said axial flange, and a plurality of integral tangs on said member disposed within said chambers, said tangs extending radially and axially outwardly into biting engagement with the base flange of said rim, the width of said tangs being relatively small compared to the circumferential dimension of said depressed portions.

3. In a wheel assembly, the combination comprising a drop center rim having a base flange, a wheel body part having an axial inwardly extending flange secured at a plurality of circumferentially spaced points to said base flange, said axial flange being depressed radially inwardly between said spaced points to define a series of chambers which are open at their axial ends only, an ornamental member disposed in intimate contact over the outer surface of said body part and over a substantial portion of the depressed portions of said axial flange, and a plurality of tangs integral with the outer marginal edge of said member and disposed in proximity to the inner peripheral edge of said axial flange, said tangs extending into biting engagement with a wall of said chambers.

4. In a wheel assembly, the combination comprising a drop center rim having a base flange, a wheel body part having an axial inwardly extending flange secured at a plurality of circumferentially spaced points to said base flange, said axial flange being depressed radially inwardly between said spaced points to define a series of chambers which are open at their axial ends only, an ornamental member disposed in intimate contact over the outer surface of said body part and over a substantial portion of the depressed portions of said axial flange, and a plurality of integral tangs on said member disposed within said chambers and in proximity to the inner peripheral edge of said axial flange, said tangs extending radially and axially outwardly into biting engagement with the base flange of said rim.

5. In a wheel assembly, the combination comprising a drop center rim having a base flange, a wheel body part having an axial inwardly extending flange secured at a plurality of circumferentially spaced points to said base flange, said axial flange being depressed radially inwardly between said spaced points to define a series of chambers which are open at their axial ends only, an ornamental member disposed in intimate contact over the outer surface of said body part and over a substantial portion of the depressed portions of said axial flange, and a plurality of integral tangs on said member disposed in proximity to the inner peripheral edge of said axial flange, said tangs extending radially and axially outwardly into biting engagement with the base flange of said rim, the width of said tangs being relatively small compared to the circumferential dimension of said depressed portions.

6. In a wheel assembly, the combination comprising a wheel body part including an axially inwardly extending flange, a drop center rim secured to said axial flange, said body part having a series of elongated air circulation apertures at the junction point of said rim and body part, and an ornamental member disposed over the outer surface of said body part, said member being provided with a plurality of integral tangs which extend into said opening and make a biting engagement with said base flange of said rim.

7. In a wheel assembly the combination comprising a wheel body part including an axial inwardly extending flange, a drop center rim secured to said axial flange, said axial flange being bent radially inwardly at a plurality of points to form a series of air circulation passageways through said wheel assembly, and an ornamental member disposed over the outer surface of said body part, said member having a plurality of integral tangs which extend radially and axially outwardly to make a biting engagement with said base flange of said rim.

8. In a wheel assembly, the combination comprising a body part including an axial inwardly extending flange, a drop center rim secured to said axial flange, said axial flange being bent radially inwardly at a plurality of points to form a series of air circulation passageways through said wheel assembly, and an ornamental member disposed in intimate contact over the outer surface of said body part and a substantial part of the bent portions of said axial flange, said member having a plurality of integral tangs at its outer marginal edge which are bent radially and axially outwardly into biting engagement with the base flange of said rim.

GEORGE ALBERT LYON.